United States Patent [19]

Place et al.

[11] Patent Number: 6,125,329
[45] Date of Patent: Sep. 26, 2000

[54] METHOD, SYSTEM AND PROGRAMMED MEDIUM FOR MASSIVE GEODETIC BLOCK TRIANGULATION IN SATELLITE IMAGING

[75] Inventors: Michael Place, Eldersburg; Jon Dykstra, Potomac; Charles Sheffield, Silver Spring; Roger Mitchell, Chevy Chase, all of Md.

[73] Assignee: Earth Satellite Corporation, Rockville, Md.

[21] Appl. No.: 09/098,646

[22] Filed: Jun. 17, 1998

[51] Int. Cl.[7] ...................................................... G06F 19/00

[52] U.S. Cl. .................................................................. 702/5

[58] Field of Search ................................ 702/5; 382/154, 382/284

[56] References Cited

U.S. PATENT DOCUMENTS 5,187,754 2/1993 Currin et al. ............................ 382/284
5,259,037 11/1993 Plunk ........................................ 382/154
5,381,338 1/1995 Wysocki et al. ........................ 348/116

Primary Examiner—Donald E. McElheny, Jr.
Attorney, Agent, or Firm—Dickstein Shapiro Morin & Oshinsky LLP

[57] ABSTRACT

A computationally efficient method, system and programmed medium according to the present invention creates highly accurate maps of celestial bodies, spanning multiple UTM zones given sparse control points on the celestial body surface without requiring the existence or synthesis of a mathematical model of the satellite image sensor. The present invention provides an improved method and system for producing orthorectification coefficients needed to produce highly accurate maps of the surface of celestial bodies that span multiple UTM zones.

30 Claims, 11 Drawing Sheets

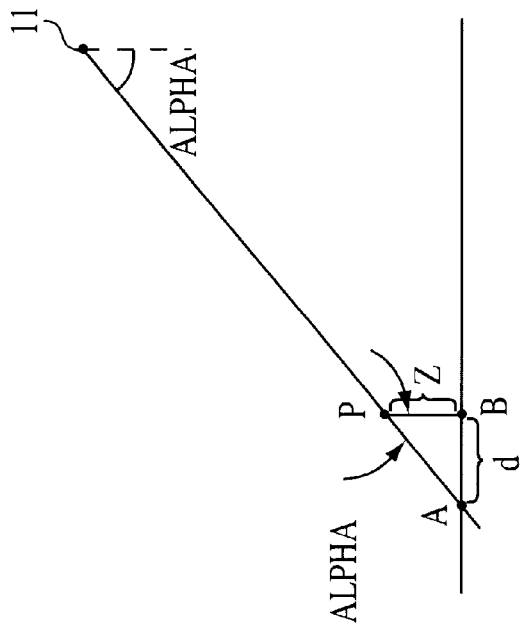

$$D_{i,j} = \sum_{n=1}^{N} \left( \frac{\partial e(n)}{\partial p_i} \cdot \frac{\partial e(n)}{\partial p_j} \right)$$

WHERE:
$D_{i,j}$ IS A HESSIAN MATRIX ELEMENT WITH ROW i AND COLUMN j;
$p_i$ IS PARAMETER i OF THE SIX AFFINE COEFFICIENTS $u_1, u_2, u_3, w_1, w_2, w_3$;
$p_j$ IS PARAMETER j OF THE SIX AFFINE COEFFICIENTS $u_1, u_2, u_3, w_1, w_2, w_3$;
N IS THE NUMBER OF POINTS (CONTROL AND TIE);
$e(n)$ IS THE ERROR FUNCTION EVALUATED AT POINT n.

FIG. 10

METHOD, SYSTEM AND PROGRAMMED MEDIUM FOR MASSIVE GEODETIC BLOCK TRIANGULATION IN SATELLITE IMAGING

BACKGROUND OF THE INVENTION

1. Field of the Invention

The present invention relates to satellite imaging of celestial bodies and more specifically, to a method, system and programmed medium for massive geodetic block triangulation resulting in determining orthorectification coefficients for the creation of wide-ranging, highly accurate maps of the surface of celestial bodies.

2. Discussion of Related Art

Various methods are known for creating detailed, mathematically precise maps of the surface of celestial bodies. The most prevalent method is ground surveying. Ground surveying, however, requires extensive effort and time to determine the positions of points, the locations of which are not precisely known, on the ground relative to other points, known as control points, the locations of which are precisely known. To overcome this drawback, photography methods were developed. Photography alleviates the time-consuming ground survey effort to a certain extent by allowing the collection of position data for many points in a single image. The science of obtaining such position data from photographs is known as photogrammetry. Ground-based images can be used for photogrammetric measurements, but aerial photography has proven more useful and popular. Unfortunately, aerial surveying is not only expensive and time-consuming, but also produces maps of only relatively small areas of the surface of celestial bodies. For each image produced by aerial photography, several different types of errors must be corrected before the image data can be used to produce a map. These errors include:

attitude: tilt effects due to aircraft/sensor orientation relative to the surface;

altitude: scale effects due to distance variations between the sensor and points on the ground;

local relief: distortion due to terrain variation on the surface of the celestial body; and internal sensor characteristics: inaccuracies/distortions due to imaging sensor characteristics.

Additionally, aerial photography uses control points (which are points on the ground with precisely known location) to correlate the image data to the surface of the celestial body. Moreover, points common to images of neighboring areas, known as tie points, must be identified to match together adjoining images.

Because each image produced using conventional aerial photography covers only a small portion of the surface of a celestial body, it would be uneconomical to attempt to map large surfaces, such as a whole continent, ocean, or earth. The synoptic perspective of satellite technology, however, has changed the economics of mapping the surface of a celestial body. Satellites in orbit around a celestial body can view large areas at once and, depending on the characteristics of the orbit, allow imaging sensors to cover almost the entire surface of a celestial body. With the advent of non-military high-resolution imaging technology, satellites can produce highly detailed images of nearly the entire surface of a celestial body in a short period of time. NASA programs such as APOLLO and LANDSAT have successfully deployed these types of imaging systems for the Earth and the moon.

An additional advantage of present-day satellite imaging is that satellite image sensors have incorporated the capability of producing digital image data. This advance allows the automatic manipulation of image data by computers for the purpose of creating orthorectified maps. An orthorectified map is a conventional planar map on which each point is represented as if the viewer were directly above that location, looking straight down. In this way, by definition, the direction of observation is situated orthogonally (at an angle of 90°) to the plane of the map itself, thus negating the distorted effects of local relief.

While some satellite imagery approximates an orthogonal orientation to the surface of a celestial body, this is not the general case and satellite image data must be corrected for the same errors as aerial photography. Conventional methods for correcting satellite image data for these defects, however, require information that may be difficult and/or expensive to acquire. For example, traditional corrections for satellite/sensor tilt require knowledge of the exact orientation and position of the sensor relative to the surface of the celestial body at the instant the image is acquired, which may not be available to an acceptable degree of accuracy.

In addition, ground control points may not be available for underdeveloped and/or sparsely populated portions of celestial bodies. Without complete and accurate sensor and control point data, the error correction problem is analytically underdetermined and alternate solution methods are required.

One alternative solution, used, for example, in the products of TRIFID Corporation, utilizes an elaborate mathematical model of the satellite sensor to determine sensor characteristics for each image. This approach estimates a sensor orientation and position for each image and uses the estimated values in the error-correction calculations. Because small errors in sensor position can result in very large variations in surface image data, a very high degree of accuracy and precision is required in both the synthesis and error-correction stages of using the sensor mathematical model. These requirements serve to concentrate the effort of this approach on constructing and refining the sensor math model. In the case of numerous satellite remote sensing systems, a rigorous sensor math model is not available, and even when available, would require access to geometrically unaltered image and ephemeris data, which is likely difficult to obtain.

Recent developments in the area of computing technology have helped make satellite photogrammetry an economically feasible solution to the problem of making accurate maps of an entire celestial body. Satellite image data is now available through international data distribution networks on an inexpensive basis from government sources. In addition, the advent of cheap, powerful computing power allows inexpensive computation of orthorectification coefficients in a reasonable amount of time using a computer.

Another approach to correcting satellite image data uses an iterative computational process to correlate adjoining images, but is unsuitable for mapping the surface of a celestial body due to computational limitations. This solution uses an iterative process to compensate for a lack of control points without requiring comprehensive image sensor data. However, this technique applies to small portions of the Earth surface, not spanning more than one Universal Transverse Mercator (UTM) zone. A UTM zone is defined as an area on the surface of a celestial body spanning six degrees in longitude and latitude. Because this approach is limited to such a small area of image coverage, it cannot be used to accurately map more than a small portion of the surface of a celestial body. Nevertheless, sophisticated software tools have been developed and refined that implement complex iterative solution algorithms such as the Levenberg-Marquardt (LM) algorithm described in Demuth and Beale, Matlab Neural Network Toolbox, *The Mathworks,* 1994, incorporated by reference herein. These advances make accurate map-creation for an entire celestial body an economically viable option if significant amounts of independently-generated data are not required, such as detailed sensor or control point information.

Most known methods for orthorectifying image data, however, were created for relatively low-altitude aerial photography or for concentration on specific small surface areas of interest. These methods are generally unsuited for orthorectification of very large portions of the surface of a celestial body. Because these methods cannot span multiple UTM zones, they are not practically useful for the large-scale task of mapping the entire surface of a celestial body. What is more, control points are often not available in previously unmapped areas of the surface of a celestial body—areas in which satellite mapping may provide the only economical or practical solution.

The problem solved by the present invention is described in reference to FIGS. 2 and 3. Satellite 11 orbits celestial body 13 with a geodetic coordinate system superimposed. In the geodetic coordinate system, the location of point P on the surface is described by three numerical values:

the angle between the plane of the Greenwich Meridian 23 and the meridian plane 24 passing through point P measured along the plane of the equator 25 (geodetic longitude);

the angle between two lines in the meridian plane 24 of point P: the semi-major axis of the celestial body and a line perpendicular to the body surface at point P (geodetic latitude); and the distance between the center of the celestial body and point P.

When a digital image 21 is produced by the orbiting satellite 11, the points of the image roughly correspond to points on a planar approximation 22 of the surface of the celestial body 13. FIG. 3 illustrates the projection of points in geodetic coordinates on the surface of the celestial body 31 onto the planar approximation 22 for any given map projection.

In order to produce an orthographic map, information from the satellite image must be corrected for error due to tilt, scale, elevation distortion, and sensor inaccuracies. These corrections are accomplished through orthorectification calculations well-known in the art. In order to perform such calculations, orthorectification coefficients must be created for each image. The creation of orthorectification coefficients becomes more difficult when a series of images of the surface of the celestial body must be assembled together in a complete and accurate map of the surface.

There is a need, therefore, for a method and system of satellite photogrammetry capable of producing an accurate mapping the surface of a celestial body without a large number of control points, without a sensor math model, and with the ability to span multiple UTM zones.

SUMMARY OF THE INVENTION

The present invention significantly alleviates the deficiencies in the prior art by providing a computationally efficient method, system and programmed medium for creating highly accurate maps of celestial bodies, spanning multiple UTM zones given sparse control points on the body surface without requiring or synthesizing a mathematical model of the satellite image sensor. The present invention provides an improved method and system for creating orthorectification coefficients needed to produce highly accurate maps of the surface of celestial bodies and further allows the production of highly accurate maps spanning multiple UTM zones. Moreover, the present invention allows the production of highly accurate maps given very few control points on the surface of celestial bodies and using image data for regions in which no control points are available. In addition, the present invention allows the production of highly accurate maps in the absence of an available or computed mathematical model of the satellite image sensor, thereby avoiding the cumbersome and time-consuming process of synthesizing and/or using such a model.

A method for producing a map of a surface using satellite imagery, control points, tie points and digital terrain module data according to the present invention, comprises the following steps:

correcting parallax errors by using said tie points, control points and digital terrain module data;

calculating non-linear solution errors for said tie points and control points; and converting said non-linear solution errors into angular geodetic coordinates;

whereby orthorectification coefficients are calculated for producing said map of said surface.

In addition, a system for producing a map of a surface using satellite imagery, control points, tie points and digital terrain module data according to the present invention, comprises:

means for correcting parallax errors by using said tie points, control points and digital terrain module data;

means for calculating non-linear solution errors for said tie points and control points; and means for converting said non-linear solution errors into angular geodetic coordinates;

whereby orthorectification coefficients are calculated for producing said map of said surface.

These and other advantages of the present invention will be apparent to those skilled in the art from the following detailed description and the accompanying drawings.

BRIEF DESCRIPTION OF THE DRAWINGS

FIG. 10 is an example of parallax offset correction performed in the Terrain Module of the MOSPOLY generator in FIGS. 5 and 6.

DETAILED DESCRIPTION OF THE PREFERRED EMBODIMENTS

Figure 4:
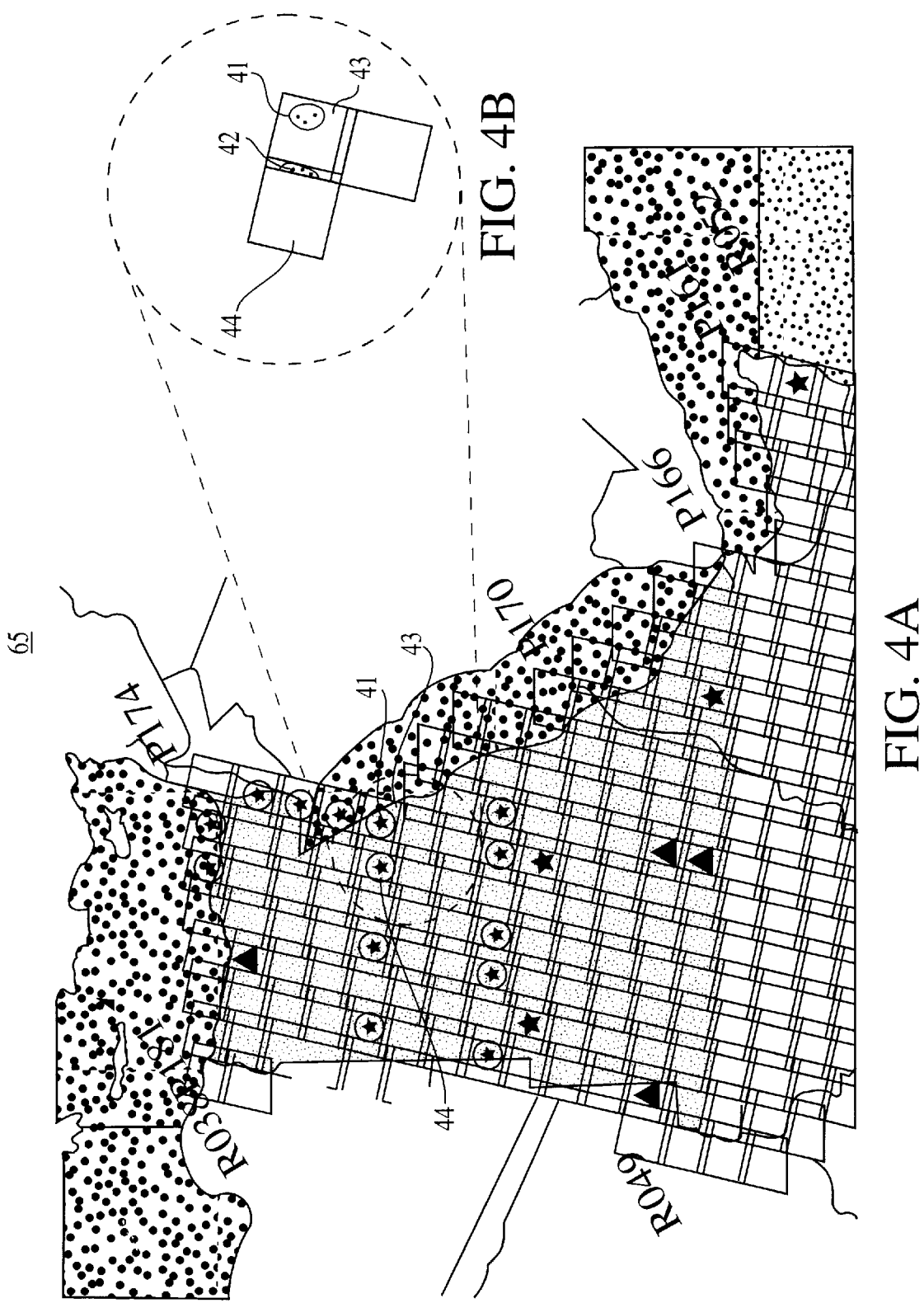
FIG. 4A is a planar map that shows overlapping images of the surface of a celestial body with sample tie point and control point locations.
FIG. 4B is an expanded schematic top view of several of the overlapping images of the surface of a celestial body shown in FIG. 4A.
Figure 5:
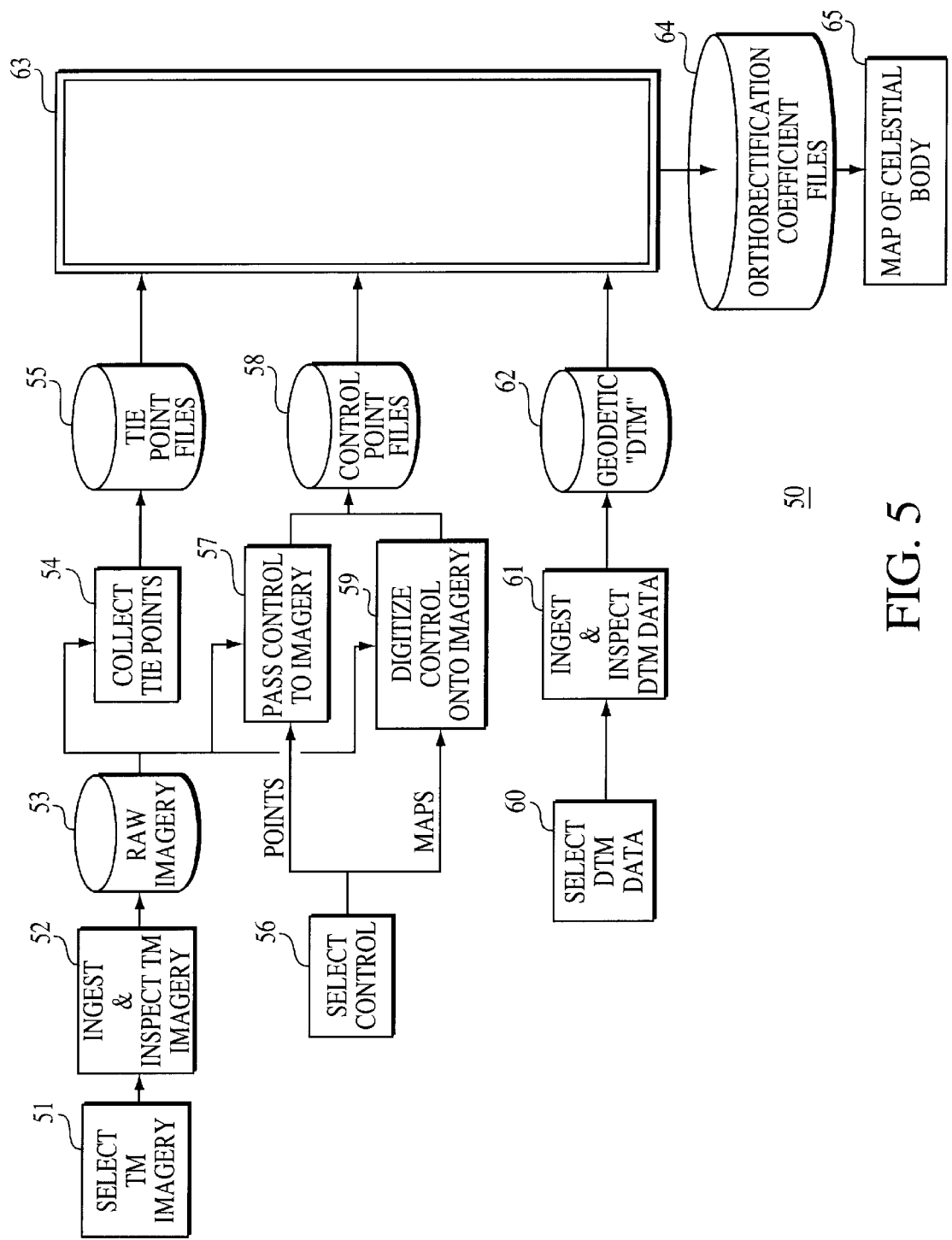
FIG. 5 is a high-level block diagram illustrating the production of orthorectification component of the present invention using a Mosaic Polynomial (MOSPOLY) generator.

The preferred embodiments of the present invention are now described in detail in connection with the accompanying drawings wherein like reference numerals refer to like elements. Referring now to FIG. 5, therein shown is the method and system of the present invention. It should be noted that elements illustrated in FIG. 5 can either be implemented as computer software, hardware or firmware components, using conventional programming methods and techniques. System 50 performs a generic bundle adjustment workflow, which can be described as the succession of tasks needed to transform unaltered satellite images into orthorectification coefficient files 64. Orthorectification coefficient files 64 produced by this system are used to create a map 65 shown in FIG. 4A of the surface using calculations well known in the art of photogrammetry. In the preferred embodiment, these calculations can be performed in the following manner. A row and column on the original satellite imagery can be computed for a given pair of coordinates of the output orthorectified image using the following expressions:

$$R = u_1 * N + u_2 * E + u_3$$

$$C_p = w_1 * N + w_2 * E + w_3$$

$$C = C_p + d$$

$$d = z * \tan(\text{alpha})$$

where $u_1, u_2, u_3, w_1, w_2, w_3$ are the orthorectification coefficients for a single image;

R is the image row on the original satellite image;

C is the image column on the original satellite image;

N is the "northing" coordinate on the orthorectified image;

E is the "easting" coordinate on the orthorectified image;

z is the elevation, as shown in FIG. 10 at point of interest P;

alpha is the look angle, shown in FIG. 10, for satellite 11 position relative to point of interest P.

In the Select Thematic Mapping (TM) Imagery block 51, digital images of the area to be mapped are selected manually by the operator from the images taken by the satellite 11. These digital images are then provided to the Ingest and Inspect TM Imagery block 52, where the digital images are read into a processor or computer and inspected for possible data accuracy/integrity problems such as cloud cover or data drop-outs. The raw imagery that passes inspection is then collected in Raw Imagery block 53. Block 53 can comprise conventionally known storage hardware such as magnetic, optical, tape or other storage systems. Analysis of the raw imagery then occurs in Collect Tie Points block 54 to identify tie points, which are points common to two separate adjacent images. As in block 52, the identification of the tie point locations in blocks 54 and 55 can be accomplished by one or more processors, computers and/or appropriate software. Sample tie point locations are illustrated in FIG. 4B, as points 42. The tie point locations are recorded in row and column format for each image on the grid comprising map 65 illustrated in FIG. 4A and are collected in computer files in Tie Point Files block 55.

The Select Control block 56, controls points representing known positions on the surface of the celestial body (control or map points), which are input and selected manually by the operator using conventionally known input/output devices. Control points can be supplied in one of two different formats:

three numerical values representing the location of the control point in geodetic coordinates, or printed maps with elevation notations.

If a control point is supplied in the first format of three numerical values, this point is manually matched with a point on the satellite image. It should be noted, however, that an embodiment of the invention can operate by allowing for automated control point matching between computer stored known positions and data from the satellite. The row and column on the image from Raw Imagery block 53 corresponding to the control point is recorded and all five values (three geodetic coordinates plus row and column on the image) in Pass Control to Imagery Block 57. The row and column of the image corresponding to the control points are subsequently collected in computer Control Point Files block 58.

Alternatively, if a control point is supplied in the format of a printed map, the location of the control point in geodetic coordinates must be digitized from the map by the operator before matching with the image data in Digitize Control onto Imagery block 59 and collection of image data corresponding to the control points in Control Point Files block 58.

The Digital Terrain Model (DTM) of the surface of the celestial body, representing the height at each point on the surface in geodetic coordinates, is selected manually by the operator in this embodiment and is read into the computer in Select DTM Data block 60. However, it should be noted that the present invention contemplates that the collection of the DTM data can occur automatically. This DTM data is inspected for data integrity in block 61 either manually or by means of an appropriate processor having conventionally known parameters for defining data integrity. The DTM data is then collected in computer files in Geodetic DTM block 62.

Orthorectification coefficients using the Mosaic Polynomial (MOSPOLY) generator are calculated in block 63. The method employed in the MOSPOLY generator uses tie point, control point, and DTM data to produce orthorectification coefficients which are collected in Orthorectification Coefficient computer files 64 for subsequently creating a map of the celestial body 65.

Figure 1A:
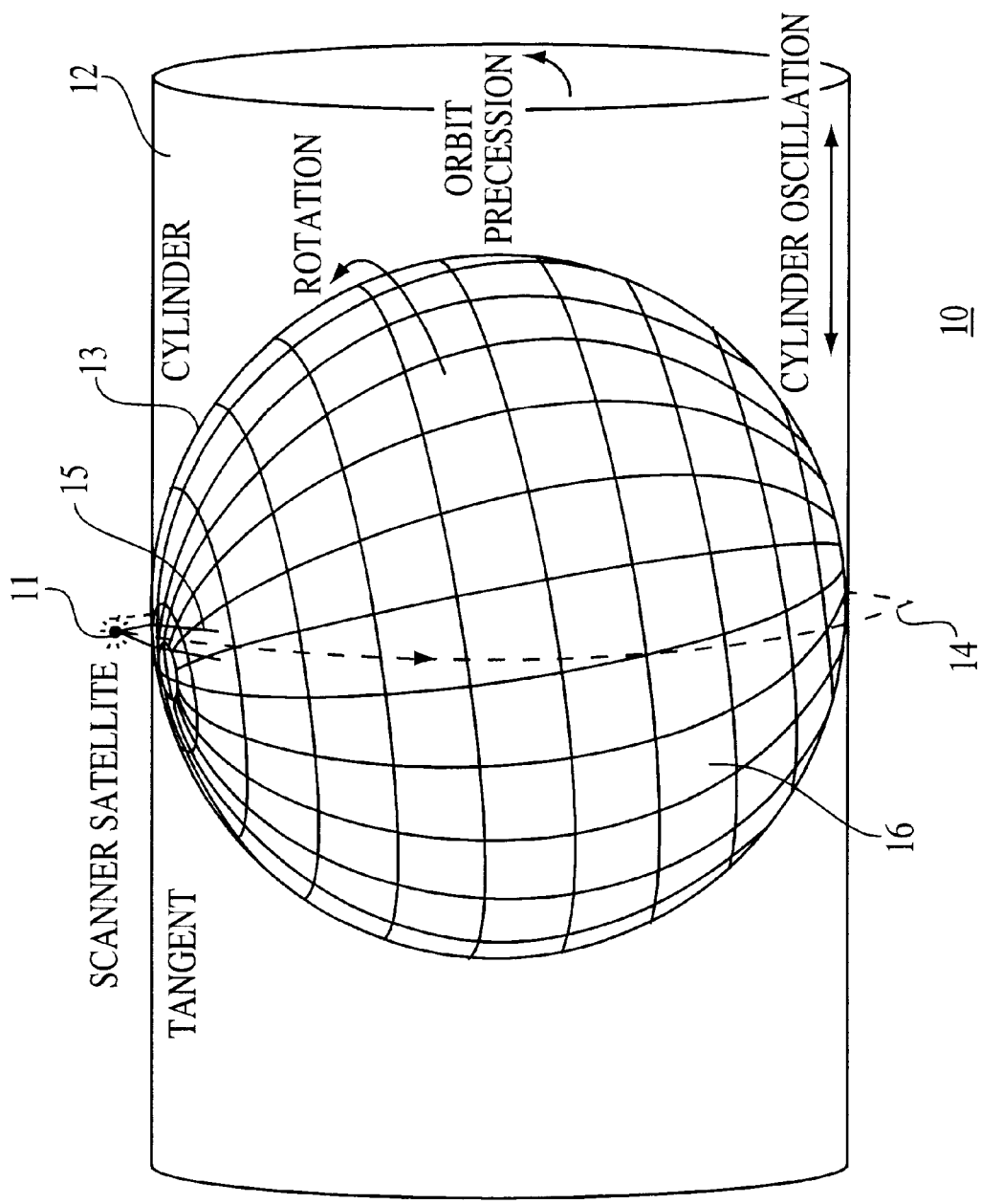
FIG. 1A is a schematic perspective view of a satellite orbiting a celestial body, such as the earth, in a sun-synchronous (near polar) orbit with the imagery being cast on a cylindrical map projection, or Space Oblique Mercator (SOM) projection.
Figure 1B:
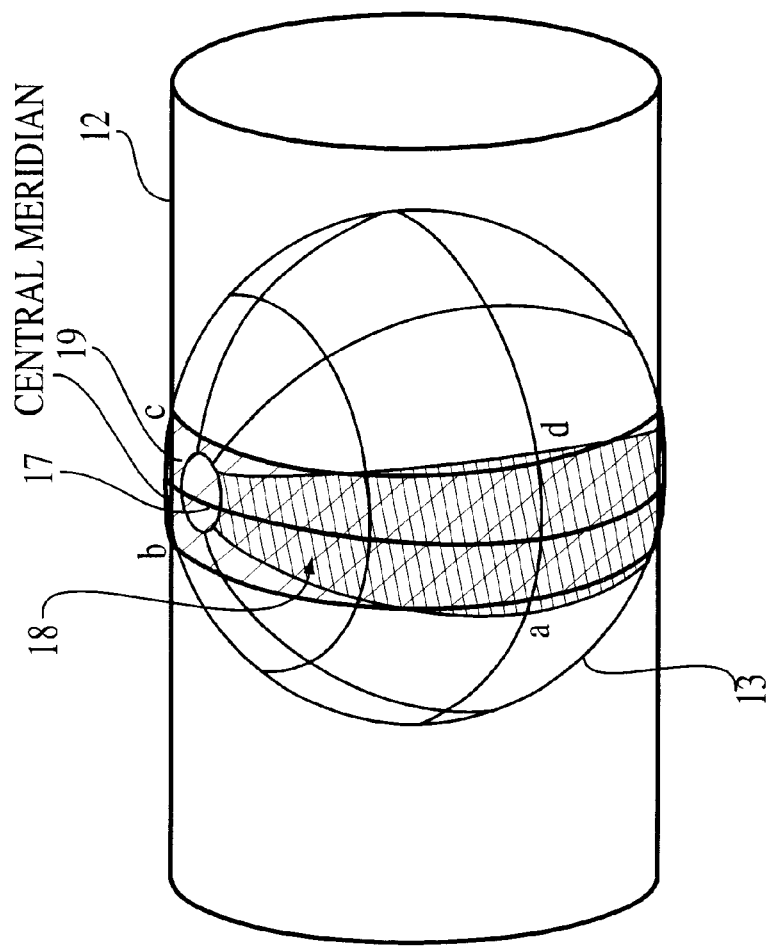
FIG. 1B is a schematic perspective view of a transverse mercator map projection.
Figure 2:
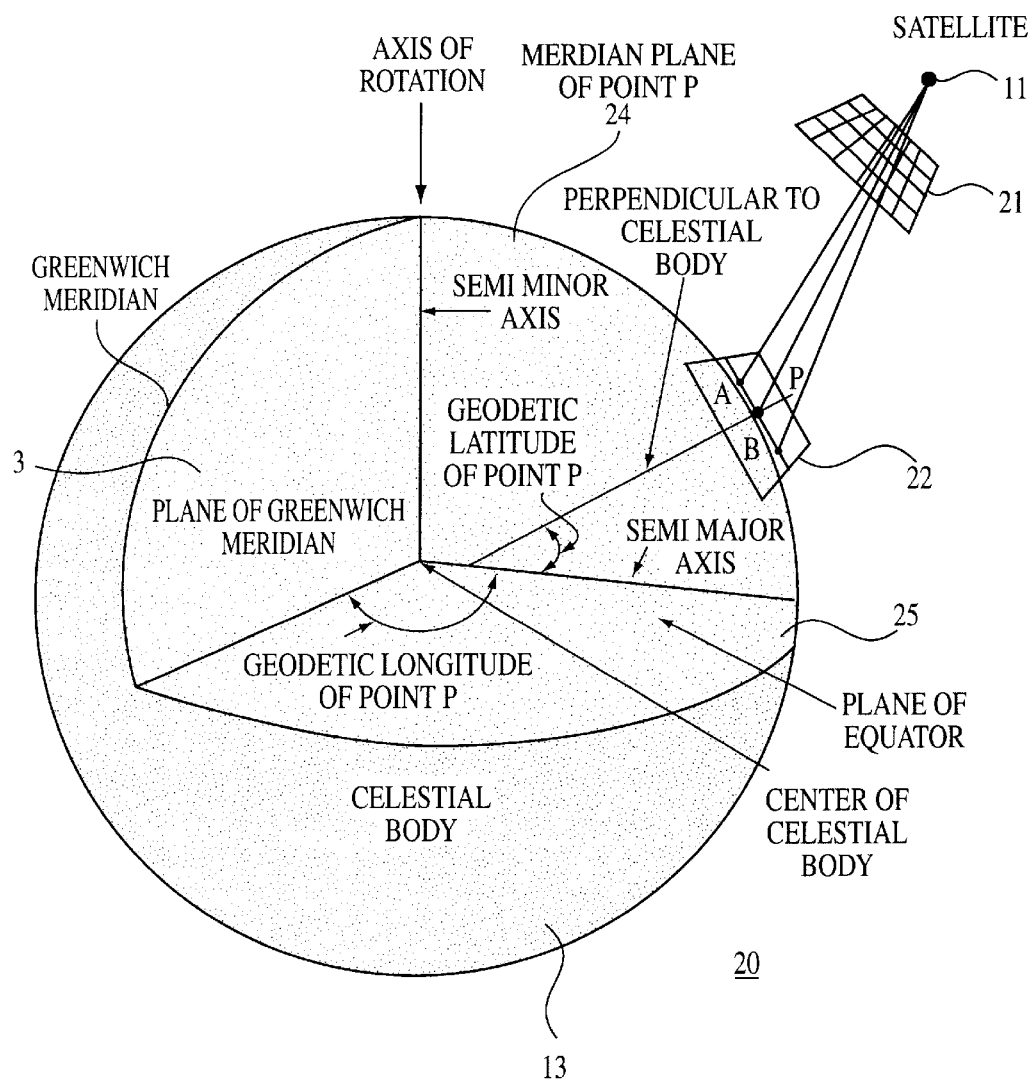
FIG. 2 is a perspective view of a satellite observing a celestial body with a geodetic coordinate system superimposed on that body, an image plane corresponding to the satellite observation imagery, and a planar approximation of the observed area on the surface of the celestial body.
Figure 3:
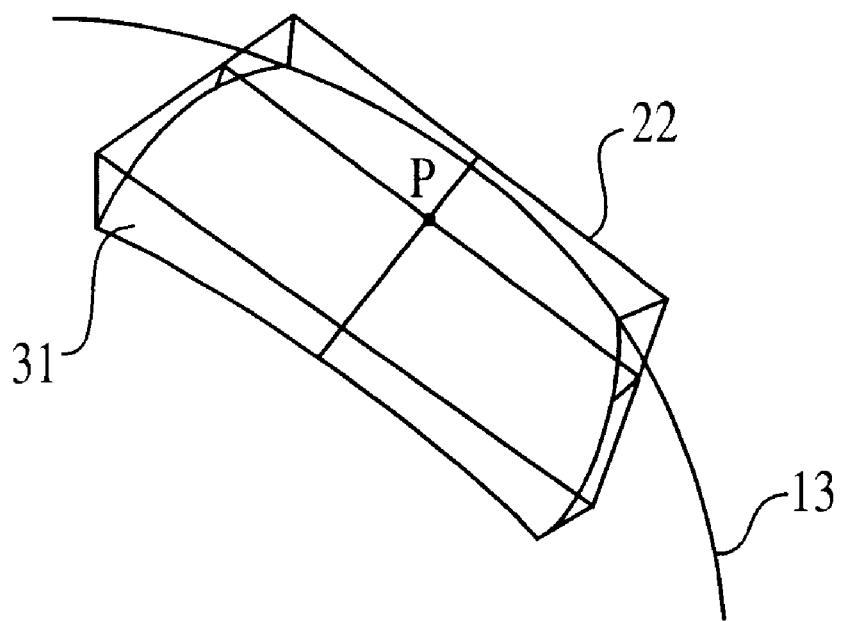
FIG. 3 is a perspective view of the planar approximation mapping the surface of the celestial body shown in FIG. 2.
Figure 6:
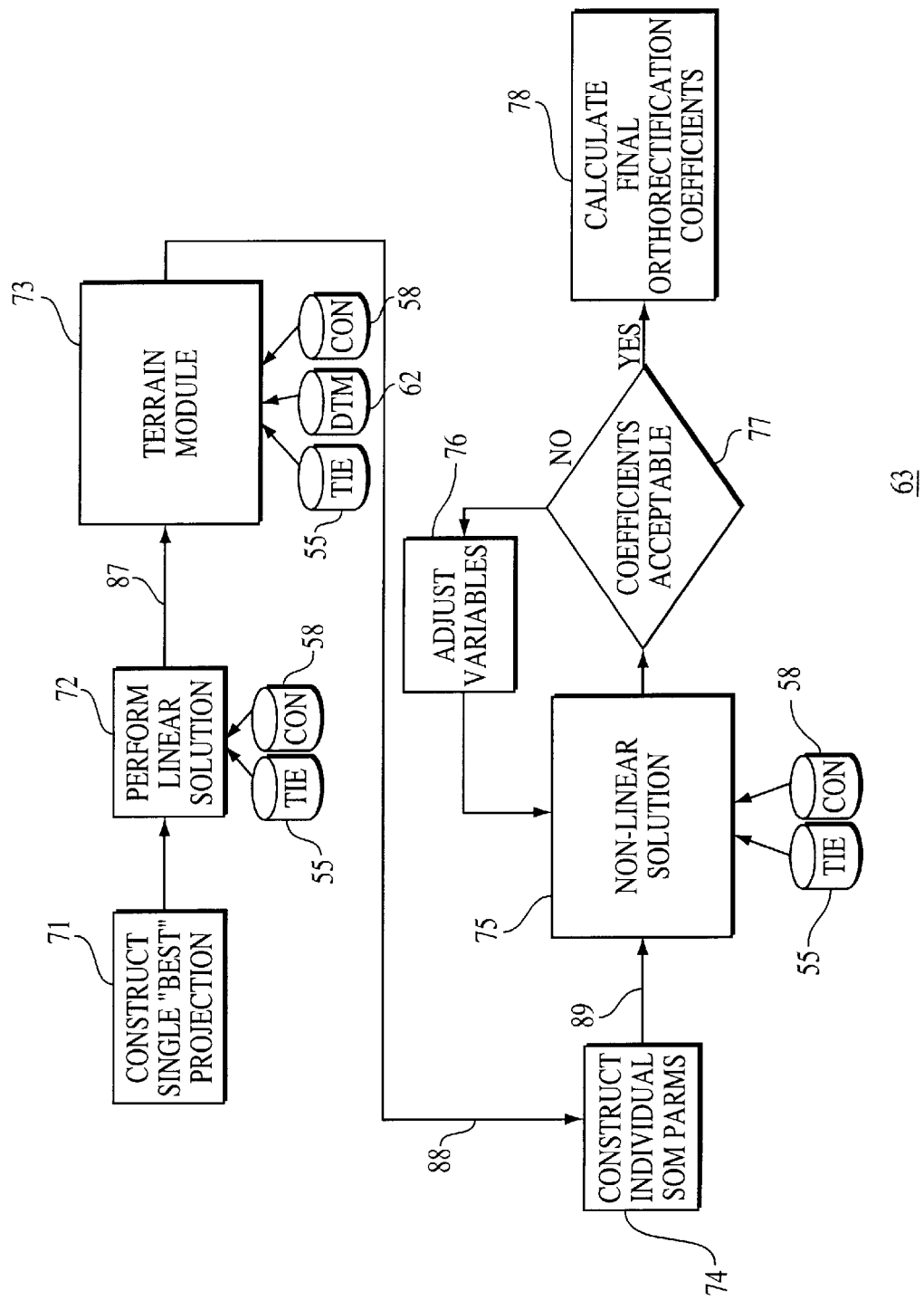
FIG. 6 is a block diagram illustrating the logic and data flow in the MOSPOLY generator of FIG. 5.

The MOSPOLY method used in generator 63 is shown in more detail in FIG. 6. Referring now to FIG. 6, therein shown are tie points 55, control points 58, and DTM data 62 which are used at several stages in the MOSPOLY method to calculate orthorectification coefficients. The first step in the process is to determine a single "best" mercator map projection 71 that roughly corresponds to the area of interest on the surface of the celestial body. As illustrated in FIG. 1B, the "best" projection is roughly estimated as a transverse mercator 19 centered on the average of the longitudes 17 for the area of interest 18. A transverse mercator map projection is one that projects the surface of a celestial body onto a circular cylinder 12 wrapped around a meridian of the celestial body 13. Transverse mercator projection 19 of the area of interest 18 on the surface of celestial body 13 is obtained by mapping the area of interest onto cylinder 12 centered along central meridian 17 of the celestial body 13.

Referring again to FIG. 6, once the single "best" projection is defined in block 71, the tie and control points undergo the transformation comprising that "best" projection so that a linearized least squares bundle adjustment calculation can be performed in block 72. Perform Linear Solution block 72 uses a transverse mercator map projection with the projection's central meridian falling in the middle of the area of interest to perform linearized least squares bundle adjustment calculation. The linear solution 72 attempts to fit the coefficients of affine transformations (one per image) to match the adjoining images in such a way that the matched images approximate the surface of the celestial body. These affine transformations map points on each satellite image to points on the transverse mercator map projection.

After the initial linear bundle adjustment in block 72, corrections due to elevation effects are performed in the Terrain Module 73. Tie point, control point, and DTM data are all input into the Terrain Module, which is shown in more detail in FIG. 7.

Figure 7:
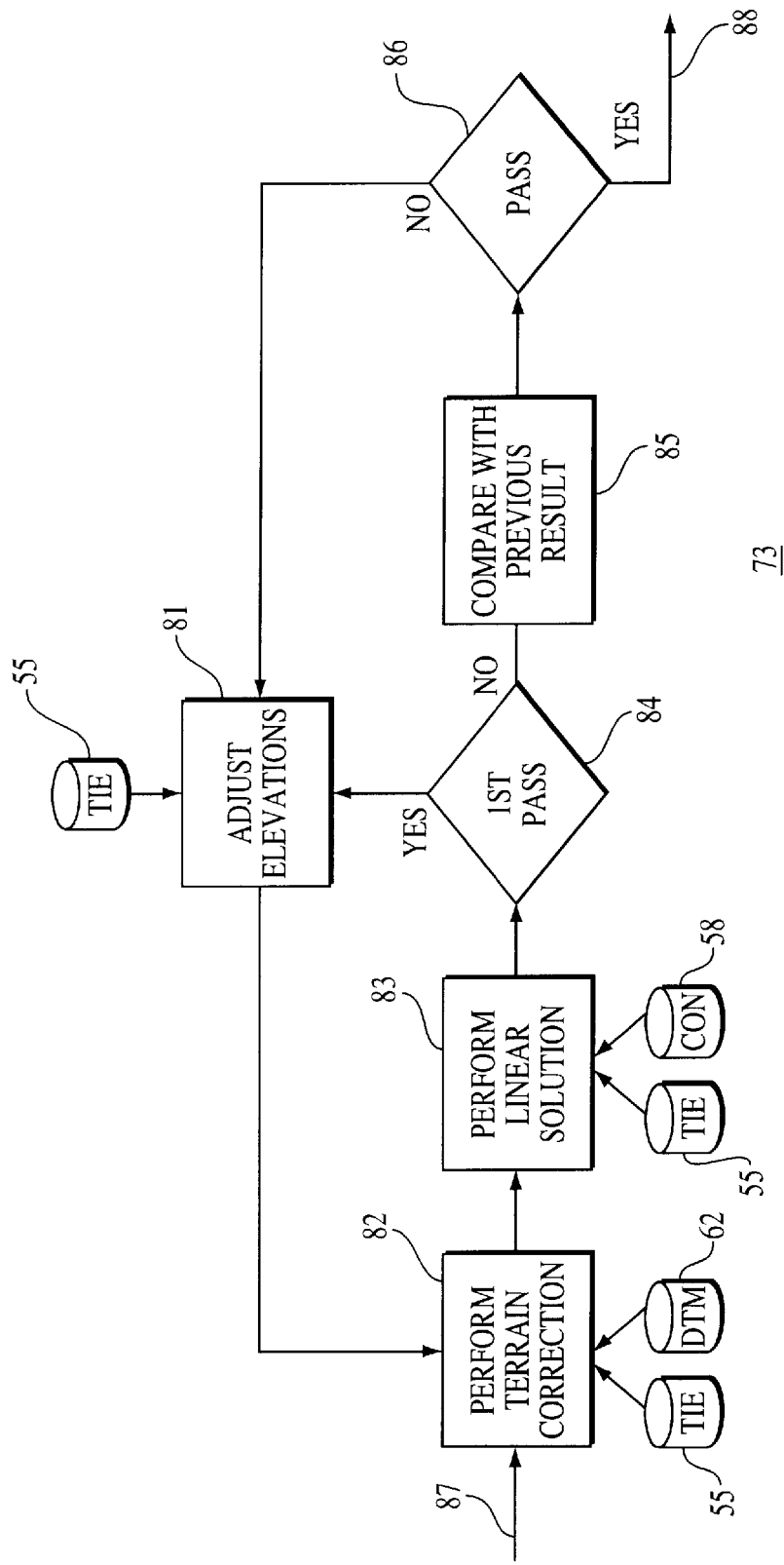
FIG. 7 is a block diagram illustrating the Terrain Module element of the MOSPOLY generator in FIGS. 5 and 6.

Referring now to FIG. 7, therein shown is the Terrain Module 73 which calculates parallax offsets for the purpose of correcting tie points for elevation effects. The output of the initial linear solution 87 is used as input to the terrain correction block 82. The terrain correction block 82 adjusts the pixel column location of a tie point on the satellite image based on elevation data taken from the DTM.

FIG. 10 shows an example of a parallax offset correction, which may be illustrated as follows. If satellite 11 is observing point P at an angle alpha, local relief effects make point P appear as if it were located in point A rather than B. To correct for this parallax error, elevation z from the DTM data is used to calculate parallax offset d in the following manner:

$$d=z*\tan(\text{alpha}).$$

Referring again to FIG. 7, the linearized bundle adjustment of block 72 is then repeated in block 83. The output of the linear solution then undergoes an iterative process whereby the terrain correction and linear solution steps are repeated after further adjustment of the tie point elevation in block 81. During the first iteration, block 84 bypasses a comparison to previous results, forcing a second iteration. This iterative process continues until column shifts compared to previous iteration results 85 are values less than or equal to a predetermined value and thus passes the operator-defined threshold 86.

Following the Terrain Module 73, the SOM map projection for the imaging satellite is constructed. The SOM map projection is shown in FIG. 1A as a cylindrical map projection positioned so that the orbit 14 of the satellite 11 defines the circumference of the cylinder. FIG. 1A illustrates a celestial body 13 and an orbiting satellite 11 equipped with imaging sensors for creating digital images of the surface of the celestial body used in the present invention. FIG. 1A also shows a circular cylinder with a circumference parallel to the orbit 14 of the imaging satellite 11 which demonstrates the imagery being cast on a cylindrical map projection or space oblique mercator (SOM) map projection.

For each image, an individual SOM projection is calculated based on the center geodetic coordinate output of Perform Linear Solution block 72 in FIG. 6. The SOM projections may be constructed as described in John P. Snyder, Map Projections—A Working Manual, U.S. Geological Survey Professional Paper 1395 (1987), incorporated by reference herein. The output of the Terrain Module 88 is then transformed according to the calculated SOM projections and used as input 89 to the Non-Linear Solution block 75, shown in more detail in FIG. 8.

Figure 8:
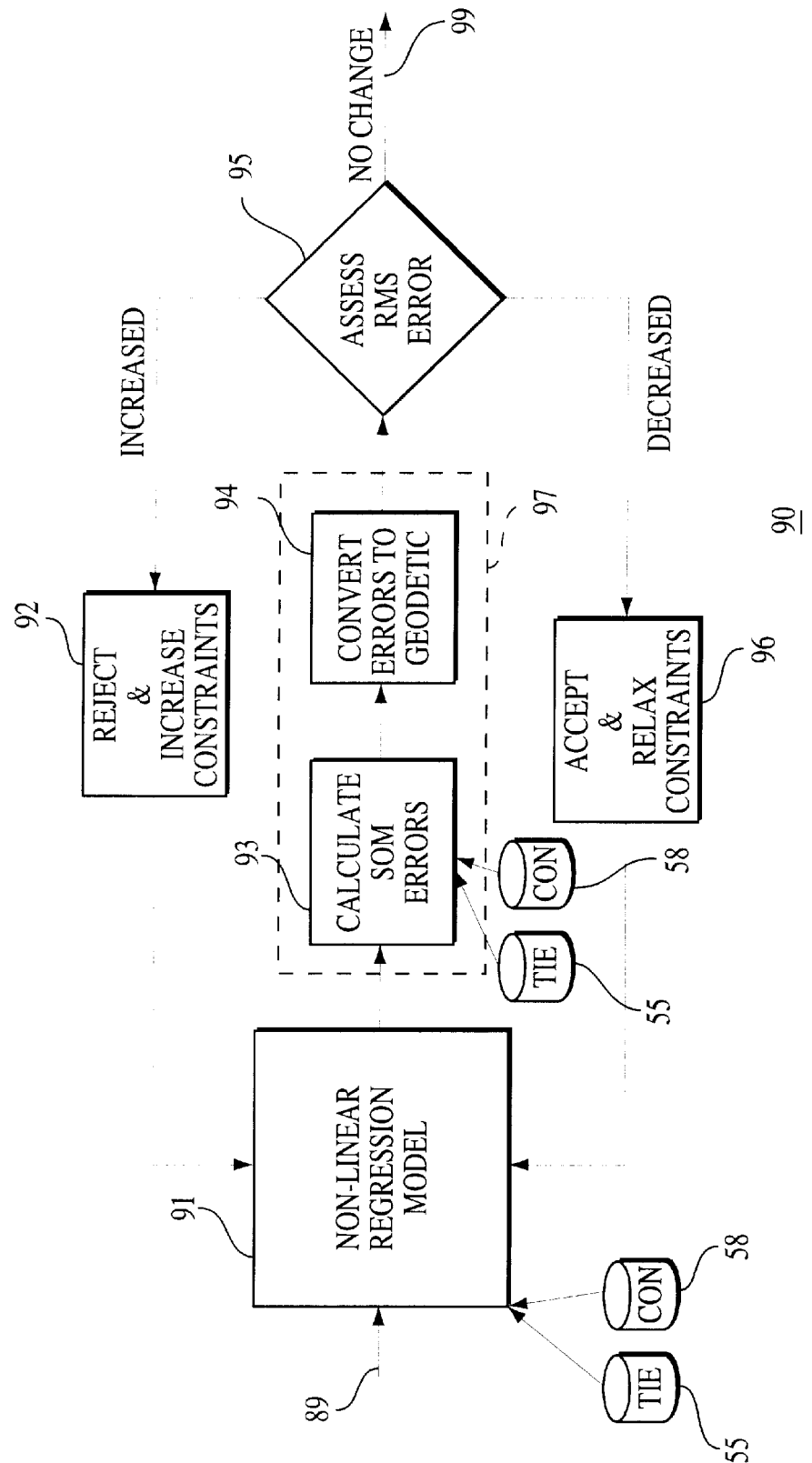
FIG. 8 is a block diagram illustrating the Non-Linear Solution element of the MOSPOLY generator in FIGS. 5 and 6.

Referring now to FIG. 8, therein shown is a block diagram of a non-linear iterative solution method/apparatus with special modifications to enable the solution of creating orthorectification coefficients with sparse control points for areas spanning multiple UTM zones. Blocks 91, 92, 95 and 96 comprise an application of the well-known LM algorithm with the following modification: before the error assessment block 95, the errors in the SOM map projection are transformed to the geodetic coordinate system.

A non-linear bundle adjustment using the least squares regression method is performed on the control and tie point locations in non-linear regression model block 91. This bundle adjustment, like the linear solution of block 72, attempts to find the coefficients of affine transformations (one per image) that best match adjoining images in such a way that the resulting image data approximates the surface of the celestial body.

Calculate SOM error block 93 then calculates the errors for each individual image in the SOM map projection for that image. These errors are the distances from known control point locations (for control points) or corresponding image point locations from an adjoining image (for tie points) to the corresponding points in the satellite imagery as calculated by the affine coefficients for that image. These cartesian errors in the SOM projection are converted to angular errors in the geodetic coordinate system in block 94. The root-mean-square (RMS) error is then assessed in block 95 by comparing the angular geodetic errors of the previous iteration with the angular geodetic errors of the present iteration. If the geodetic errors change from one iteration to the next, constraints are either increased or relaxed in blocks 92 and 96 for the next non-linear bundle adjustment iteration in block 91. A solution vector is calculated using constraint value lambda (divided or multiplied by 10, depending on whether the constraints need to be respectively relaxed or increased), for example in the following LM equation:

$$a_{next}=a_{cur}+D^{-1}*[-\text{Grad }X^2\,(a_{cur})]$$

where $a_{cur}$ is the current solution vector;

D is the modified Hessian matrix with each diagonal element multiplied by (1+lambda) where lambda is initially set at 0.001;

Grad is the gradient vector;

$X^2$ is the merit function to be minimized; and $a_{next}$=the new solution vector.

Each matrix element of the modified Hessian matrix corresponds to a combination of the six affine coefficients for every tie and/or control point and is composed of partial derivatives of the error e(n) between two affine projections of the tie and/or control points, as illustrated by the formula shown in FIG. 10.

Referring again to FIG. 8, when the RMS error is reduced to an acceptable level, the affine transformation coefficients are tentatively accepted with no change in blocks 77 and 78 on FIG. 6. Referring now to FIG. 6, the output of the Non-Linear Solution is manually evaluated by the operator time in Coefficients Acceptable block 77. This evaluation is intended to ensure the integrity and reliability of the automatically performed solution. If the operator is satisfied, final orthorectification coefficients are calculated in block 8 and collected in computer files 64 as illustrated in FIG. 5. However, the operator may not be satisfied if the solution output shows, for example, inordinately higher control point errors relative to tie point errors The operator may then adjust weighting values corresponding to relative priority of tie point error correction or control point error correction either as a block or as individual images. For example, weighting values that control translation corrections can be adjusted separately from weighting values that control rotation and scaling corrections. Initially, the bundle adjustment is not constrained to concentrate on either mode, but if the RMS error increases, imposition of this type of constraint forces the non-linear bundle adjustment calculation 91 to favor translation over rotation/scaling correction, or vice-versa, for example. The MOSPOLY method is then repeated with the adjusted weighting values. The operator may also choose to dispense with the DTM data in favor of calculated tie point elevations based on parallax determinations from two separate satellite images. In that case, the MOSPOLY method is repeated, substituting calculated parallax elevation for every point where DTM data was previously used. In addition, if no control points are available for an image, weighting values can be adjusted to constrain the amount of change in the geometry of the image in the MOSPOLY process, which is repeated. All of these operator adjustments are completed in the Adjust Variables block 76. After these adjustments are made, the MOSPOLY method is repeated until the orthorectification coefficients are acceptable to the operator.

The orthorectification coefficients are further processed to calculate an accurate map of the surface of the celestial body. The method of the present invention is used to produce maps with an average accuracy of fifty meters or less. FIG. 4A shows an example of this type of image assembly map for a portion of Northern Africa on the Earth. Two images with overlapping portions are matched together using points common to both called tie points. The entire image assembly is linked to the reference celestial body using known surface locations called control points. FIG. 4B shows an example of control points 41 and tie points 42 for overlapping images 43 and 44.

Figure 9:
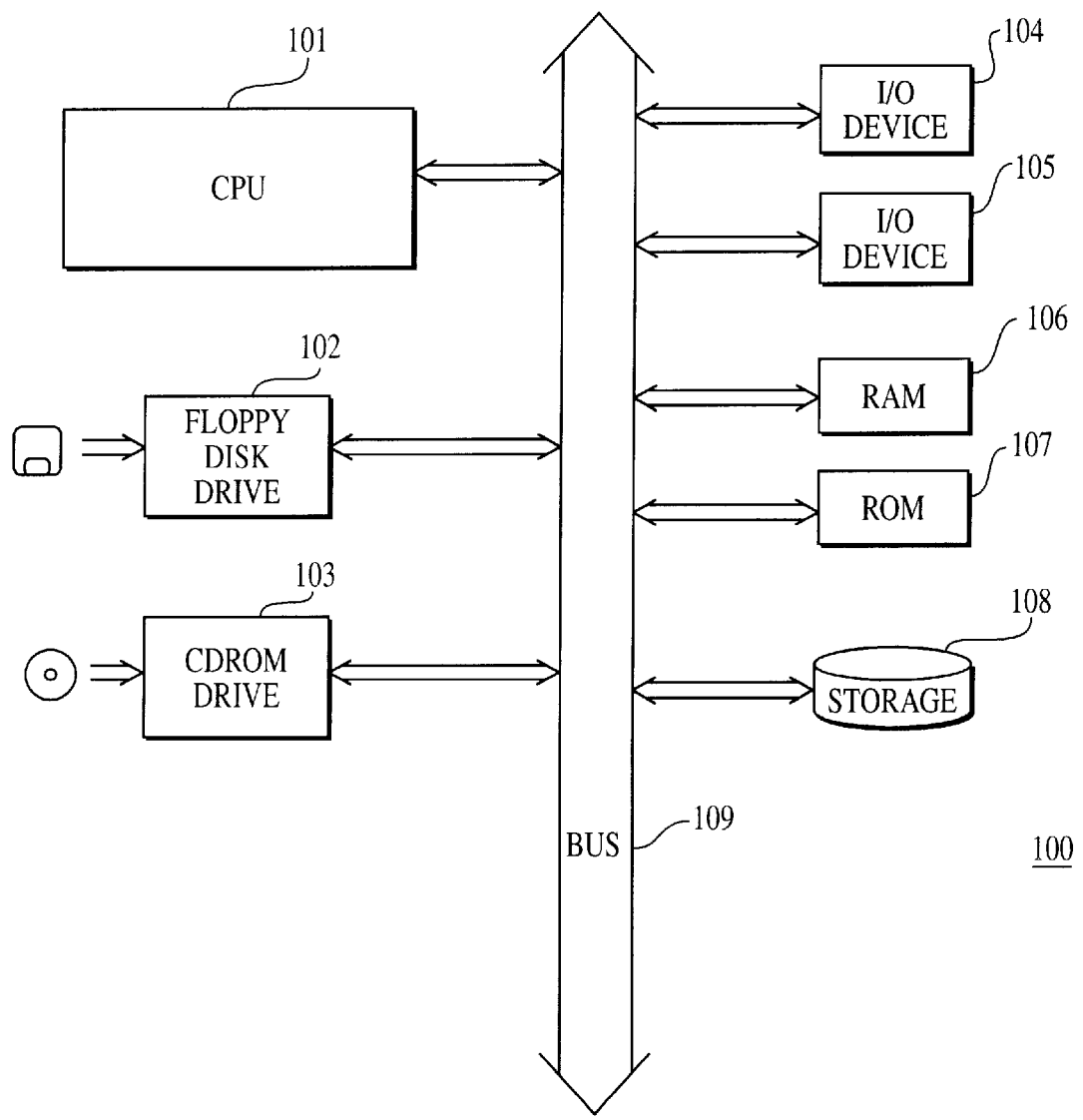
FIG. 9 is a block diagram of a computer system for controlling the hardware/software elements of the invention.

Referring now to FIG. 9, in a preferred embodiment, implementation of the MOSPOLY method to calculate orthorectification coefficients is performed on a general purpose computer system 100. The computer system 100 includes a central processing unit (CPU) 101 that communicates with system 100 via an input/output (I/O) device 104 over a bus 109. A second I/O device 105 is illustrated, but is not necessary to practice the method of the present invention.

The computer system 100 also includes random access memory (RAM) 106, read only memory (ROM) 107, and may include peripheral devices such as a floppy disk drive 102 and a compact disk (CD) ROM drive 103 which also communicate with the CPU 101 over the bus 109. It must be noted that the exact architecture of the computer system 100 is not important and that any combination of computer compatible devices may be incorporated into the system 100 as long as the MOSPOLY method of the present invention can operate on a general purpose computer system 100 having a CPU 101, I/O device 104 and RAM 106 as described below.

As previously noted, a processor, such as the processor 101 performs logical and mathematical operations required by the method of the present invention as illustrated in FIG. 5, such as data manipulation and comparisons, as well as other arithmetic and logical functions generally understood by those of ordinary skill in the art. The RAM 106 is used to store the image data, the particular output of the calculations performed at each step and program instructions required to implement the method of the present invention as illustrated in FIG. 5, and can be comprised of conventional random access memory (RAM), bulk storage memory, or a combination of both, as generally understood by those of ordinary skill in the art. The I/O device 104 is responsible for interfacing with an operator of the computer system 100 or with peripheral data devices (not shown) to receive or output data as generally understood by those of ordinary skill in the art.

Although the preferred implementation is on a programmed general purpose computer, the steps of the illustrated method may be executed in hardware, firmware, or software. The method illustrated in FIG. 5 of the present invention can reside as a computer program on a computer readable storage medium, such as a floppy disk 102 or CD ROM 103, which communicates with the CPU 101 as generally understood by those skilled in the art.

It should be recognized by those of ordinary skill in the art that the novel method of the present invention is also extensible to several other classes of mathematics and iterative solution methods, as well as imaging in the non-visible part of the spectrum.

The present invention has broad applicability not only in all satellite imaging systems, but also in any art requiring mapping of projections on a spherical surface using photographic or other images, such as digital mapping and cartography and image processing solutions in geodesy, geology and information display. The above description is intended to be illustrative, not restrictive. Many modifications which do not depart from the spirit or scope of the invention will be apparent to those skilled in the art upon reviewing the above description. Accordingly, the invention is not limited by the foregoing description, but is only limited by the scope of the appended claims.

What is claimed is new and desired to be secured by Letters Patent of the United States is:

1. A method for producing a map of a surface using satellite imagery, control points, tie points and digital terrain module data comprising the steps of:

correcting parallax errors by using said tie points, control points and digital terrain module data;

calculating non-linear solution errors for said tie points and control points;

converting said non-linear solution errors into angular geodetic coordinates;

calculating orthorectification coefficients; and producing a map of a surface from said orthorectification coefficients.

2. The method for producing a map of a surface according to claim 1, wherein said produced map spans at least one UTM zone.

3. The method for producing a map of a surface according to claim 2 further comprising the steps of:

determining a best mercator map projection of said surface;

performing a linear solution affine transformation to map points in said satellite imagery data to points on said best mercator map projection of said surface; and constructing a space oblique mercator map projection for said imaging satellite.

4. The method for producing a map of a surface according to claim 1, wherein said correcting step is iteratively repeated until a comparison with a previous result yields a value above a predetermined level.

5. The method for producing a map of a surface according to claim 1, further comprising:

iteratively performing said calculating and converting steps; and calculating final orthorectification coefficients when a level of said converted geodetic errors is above a predetermined level.

6. The method for producing a map of a surface according to claim 5 wherein said iterative step further comprises:

computing a non-linear regression model on said control and tie points to match adjoining images;

calculating space oblique mercator errors for said control and tie points;

converting said space oblique mercator errors into geodetic coordinates;

comparing said converted geodetic errors with the geodetic errors of the previous iteration; and changing constraints if a result of said comparison is outside of a predetermined interval of values and repeating said computing step with said changed constraints.

7. The method for producing a map of a surface according to claim 6, wherein said constraints are increased if said converted geodetic error is increased over said previous iteration.

8. The method for producing a map of a surface according to claim 6, wherein said constraints are decreased if said converted geodetic error is decreased over said previous iteration.

9. The method for producing a map of a surface according to claim 6, wherein said constraints comprise weighting values for translation corrections, rotation corrections and scaling corrections.

10. A system for producing a map of a surface using satellite imagery, control points, tie points and digital terrain module data comprising:

means for correcting parallax errors by using said tie points, control points and digital terrain module data;

means for calculating non-linear solution errors for said tie points and control points;

means for converting said non-linear solution errors into angular geodetic coordinates;

means for calculating orthorectification coefficients; and means for producing a map of a surface from said orthorectification coefficients.

11. The system for producing a map of a surface according to claim 10, wherein said produced map spans at least one UTM zone.

12. The system for producing a map of a surface according to claim 11 further comprising:

means for determining a best mercator map projection of said surface;

means for performing a linear solution affine transformation to map points in said satellite imagery data to points on said best mercator map projection of said surface; and means for constructing a space oblique mercator map projection for said imaging satellite.

13. The system for producing a map of a surface according to claim 10, wherein said correcting means further comprises means for iteratively calculating said parallax error until a comparison with a previous result yields a value above a predetermined level.

14. The system for producing a map of a surface according to claim 10, further comprising:

means for iteratively performing said calculating and converting steps; and means for calculating final orthorectification coefficients when a level of said converted geodetic errors is above a predetermined level.

15. The system for producing a map of a surface according to claim 14 wherein said iterative means further comprises:

means for computing a non-linear regression model on said control and tie points to match adjoining images;

means for calculating space oblique mercator errors for said control and tie points;

means for converting said space oblique mercator errors into geodetic coordinates;

means for comparing said converted geodetic errors with the geodetic errors of the previous iteration;

means for changing constraints if a result of said comparison is outside of a predetermined interval of values; and means for repeating said computing step with said changed constraints.

16. The system for producing a map of a surface according to claim 15, further comprising means for increasing said constraints if said converted geodetic error is increased over said previous iteration.

17. The system for producing a map of a surface according to claim 15, further comprising means for decreasing said constraints if said converted geodetic error is decreased over said previous iteration.

18. The system for producing a map of a surface according to claim 14, wherein said constraints comprise weighting values for translation corrections, rotation corrections and scaling corrections.

19. A computer program comprising a computer useable medium having computer program logic recorded thereon for enabling a processor in a computer system to combine satellite imagery data using control points, tie points and digital terrain module data for producing a map of a surface, said computer program comprising:

a module for correcting parallax errors by using said tie points, control points and digital terrain module data;

a module for calculating non-linear solution errors for said tie points and control points; and a module for converting said non-linear solution errors into angular geodetic coordinates;

whereby orthorectification coefficients are calculated and a map of a surface is produced using said coefficients.

20. The computer program according to claim 19, wherein said produced map spans at least one UTM zone.

21. The computer program according to claim 20 further comprising:

a module for determining a best mercator map projection of said surface;

a module for performing a linear solution affine transformation to map points in said satellite imagery data to points on said best mercator map projection of said surface; and a module for constructing a space oblique mercator map projection for said imaging satellite.

22. The computer program according to claim 19, wherein said correcting module further comprises a module for iteratively calculating said parallax error until a comparison with a previous result yields a value above a predetermined level.

23. The computer program according to claim 19, further comprising:
- a module for iteratively performing said calculating and converting steps; and
- a module for calculating final orthorectification coefficients when a level of said converted geodetic errors is above a predetermined level.

24. The computer program according to claim 23 wherein said iterative module further comprises:
- a module for computing a non-linear regression model on said control and tie points to match adjoining images;
- a module for calculating space oblique mercator errors for said control and tie points;
- a module for converting said space oblique mercator errors into geodetic coordinates;
- a module for comparing said converted geodetic errors with the geodetic errors of the previous iteration;
- a module for changing constraints if a result of said comparison is outside of a predetermined interval of values; and
- a module for repeating said computing step with said changed constraints.

25. The computer program according to claim 24, further comprising a module for increasing said constraints if said converted geodetic error is increased over said previous iteration.

26. The computer program according to claim 24, further comprising a module for decreasing said constraints if said converted geodetic error is decreased over said previous iteration.

27. The computer program according to claim 24, wherein said constraints comprise weighting values for translation corrections, rotation corrections and scaling corrections.

28. The computer program according to claim 19, wherein said surface is a surface of a celestial body.

29. A map of a surface produced using satellite imagery, control points, tie points and digital terrain module data, said map being produced by the steps of:
- iteratively calculating parallax errors for said tie and control points;
- iteratively performing non-linear space oblique mercator error calculations for said tie and control points converted into angular geodetic coordinates;
- calculating orthorectification coefficients using said calculated parallax and angular geodetic errors; and
- computing said map of said surface using said orthorectification coefficients.

30. A map according to claim 29 spanning multiple UTM zones.

* * * * *